United States Patent
Ryu et al.

(10) Patent No.: US 9,513,711 B2
(45) Date of Patent: *Dec. 6, 2016

(54) ELECTRONIC DEVICE CONTROLLED BY A MOTION AND CONTROLLING METHOD THEREOF USING DIFFERENT MOTIONS TO ACTIVATE VOICE VERSUS MOTION RECOGNITION

(75) Inventors: Hee-seob Ryu, Hwaseong-si (KR);
Seung-kwon Park, Yongin-si (KR);
Jong-hyuk Jang, Gunpo-si (KR);
Chan-hee Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,200

(22) Filed: Dec. 22, 2011

(65) Prior Publication Data
US 2012/0179472 A1    Jul. 12, 2012

(30) Foreign Application Priority Data
Jan. 6, 2011  (KR) .................. 10-2011-0001522

(51) Int. Cl.
*G10L 21/00*  (2013.01)
*G10L 15/04*  (2013.01)
(Continued)

(52) U.S. Cl.
CPC .............. *G06F 3/017* (2013.01); *G10L 15/265* (2013.01); *G10L 15/22* (2013.01); *H04M 1/72519* (2013.01)

(58) Field of Classification Search
CPC . G10L 15/265; G10L 15/22; H04M 1/72519
USPC .......................................... 704/235; 345/168
See application file for complete search history.

(56) References Cited

U.S. PATENT DOCUMENTS 5,594,469 A   1/1997  Freeman et al.
5,767,457 A   6/1998  Gerpheide et al.
(Continued)

FOREIGN PATENT DOCUMENTS

CN   101106668 A   1/2008
CN   101437124 A   5/2009
(Continued)

OTHER PUBLICATIONS

Search Report issued May 22, 2012 by the European Patent Office in counterpart European Application No. 12150202.5.
(Continued)

*Primary Examiner* — Farzad Kazeminezhad
(74) *Attorney, Agent, or Firm* — Sughrue Mion, PLLC

(57) ABSTRACT

An electronic device is provided. The electronic device includes a motion recognition unit which recognizes motion of an object and a control unit which, if a push motion in which the object located in front of the electronic device is moved in a direction of the electronic device is sensed by the motion recognition unit, activates a motion recognition mode, tracks the motion of the object, and performs a control operation of the electronic device corresponding to a subsequent motion of the object. The control unit may inactivate the motion recognition mode if an end motion in which the motion of the object is in a direction to contact a body part of a user or an additional object is recognized by the motion recognition unit while the motion recognition mode is activated. Furthermore a voice recognition mode may be activated by recognition of a motion different from the push motion.

17 Claims, 7 Drawing Sheets

(51) Int. Cl.
*H04M 1/00* (2006.01)
*G06F 3/01* (2006.01)
*G10L 15/26* (2006.01)
*G10L 15/22* (2006.01)
*H04M 1/725* (2006.01)

(56) References Cited

U.S. PATENT DOCUMENTS

| | | | |
|---|---|---|---|
| 5,855,000 | A | 12/1998 | Waibel et al. |
| 6,191,773 | B1 | 2/2001 | Maruno et al. |
| 6,351,222 | B1 | 2/2002 | Swan et al. |
| 6,498,628 | B2 | 12/2002 | Iwamura |
| 6,842,175 | B1 | 1/2005 | Schmalstieg et al. |
| 6,952,803 | B1 | 10/2005 | Bloomberg et al. |
| 7,259,756 | B2 | 8/2007 | Park et al. |
| 7,886,229 | B2 | 2/2011 | Pachet |
| 7,911,447 | B2 | 3/2011 | Kouno |
| 7,983,475 | B2 | 7/2011 | Aoki et al. |
| 8,249,334 | B2 | 8/2012 | Berliner et al. |
| 8,280,169 | B2 | 10/2012 | Linderman |
| 9,164,578 | B2 | 10/2015 | Matsubara et al. |
| 2001/0042245 | A1 | 11/2001 | Iwamura |
| 2003/0214540 | A1 | 11/2003 | Huapaya et al. |
| 2003/0233237 | A1 | 12/2003 | Garside et al. |
| 2004/0189720 | A1* | 9/2004 | Wilson et al. ............ 345/863 |
| 2006/0013440 | A1 | 1/2006 | Cohen et al. |
| 2006/0210163 | A1 | 9/2006 | Garside et al. |
| 2007/0259716 | A1 | 11/2007 | Mattice et al. |
| 2008/0013921 | A1 | 1/2008 | Kim |
| 2008/0030459 | A1 | 2/2008 | Kouno |
| 2008/0126937 | A1 | 5/2008 | Pachet |
| 2008/0134102 | A1 | 6/2008 | Movold et al. |
| 2008/0181456 | A1 | 7/2008 | Aoki et al. |
| 2008/0221882 | A1 | 9/2008 | Bundock et al. |
| 2008/0225041 | A1 | 9/2008 | El Dokor et al. |
| 2008/0259031 | A1 | 10/2008 | Yoshino |
| 2009/0018867 | A1 | 1/2009 | Reiner |
| 2009/0033616 | A1 | 2/2009 | Miyagi |
| 2009/0070109 | A1 | 3/2009 | Didcock et al. |
| 2009/0167882 | A1 | 7/2009 | Chen et al. |
| 2009/0217211 | A1 | 8/2009 | Hildreth et al. |
| 2009/0286601 | A1 | 11/2009 | Rubio et al. |
| 2009/0319894 | A1 | 12/2009 | Markiewicz et al. |
| 2010/0031203 | A1 | 2/2010 | Morris et al. |
| 2010/0034457 | A1 | 2/2010 | Berliner et al. |
| 2010/0079413 | A1 | 4/2010 | Kawashima et al. |
| 2010/0079677 | A1 | 4/2010 | Matsubara et al. |
| 2010/0131294 | A1 | 5/2010 | Venon et al. |
| 2010/0153880 | A1 | 6/2010 | Dinn |
| 2010/0210359 | A1 | 8/2010 | Krzeslo et al. |
| 2010/0235786 | A1 | 9/2010 | Maizels et al. |
| 2010/0275159 | A1 | 10/2010 | Matsubara et al. |
| 2010/0277470 | A1 | 11/2010 | Margolis |
| 2010/0295781 | A1 | 11/2010 | Alameh et al. |
| 2011/0001813 | A1 | 1/2011 | Kim et al. |
| 2011/0029869 | A1 | 2/2011 | McLennan |
| 2011/0035666 | A1 | 2/2011 | Geisner et al. |
| 2011/0053641 | A1 | 3/2011 | Lee et al. |
| 2011/0093820 | A1 | 4/2011 | Zhang et al. |
| 2011/0105190 | A1* | 5/2011 | Cha et al. ............ 455/566 |
| 2011/0161889 | A1 | 6/2011 | Scheer et al. |
| 2011/0173574 | A1 | 7/2011 | Clavin et al. |
| 2011/0210931 | A1 | 9/2011 | Shai |
| 2011/0304550 | A1* | 12/2011 | Romera Jolliff et al. .... 345/168 |
| 2011/0313768 | A1* | 12/2011 | Klein et al. ............ 704/251 |
| 2012/0096345 | A1 | 4/2012 | Ho et al. |
| 2012/0105257 | A1 | 5/2012 | Murillo et al. |
| 2012/0165074 | A1 | 6/2012 | Soldan et al. |
| 2012/0249767 | A1 | 10/2012 | Matsubara et al. |
| 2012/0306772 | A1 | 12/2012 | Tan et al. |
| 2013/0036137 | A1 | 2/2013 | Ollis et al. |
| 2013/0067411 | A1 | 3/2013 | Kataoka et al. |
| 2013/0120282 | A1 | 5/2013 | Kukulski |
| 2013/0246063 | A1 | 9/2013 | Teller |
| 2016/0018903 | A1 | 1/2016 | Matsubara et al. |

FOREIGN PATENT DOCUMENTS

| | | |
|---|---|---|
| CN | 201294582 Y | 8/2009 |
| CN | 101558367 A | 10/2009 |
| CN | 101657825 A | 2/2010 |
| CN | 101751206 A | 6/2010 |
| EP | 1645944 A1 | 4/2006 |
| EP | 1947548 A1 | 7/2008 |
| EP | 2045699 A2 | 4/2009 |
| EP | 2180395 A1 | 4/2010 |
| JP | 8-211979 A | 8/1996 |
| JP | 8-315154 A | 11/1996 |
| JP | 11-44703 A | 2/1999 |
| JP | 2004-246814 A | 9/2004 |
| JP | 200890625 A | 4/2008 |
| JP | 2008-516322 A | 5/2008 |
| JP | 2008-162376 A | 7/2008 |
| JP | 2008-269174 A | 11/2008 |
| JP | 200969202 A | 4/2009 |
| JP | 2010-79771 A | 4/2010 |
| JP | 2010-182014 A | 8/2010 |
| JP | 2010-250757 A | 11/2010 |
| JP | 2010-257093 A | 11/2010 |
| KR | 1020050065198 A | 6/2005 |
| KR | 1020060070280 A | 6/2006 |
| KR | 10200800029730 A | 4/2008 |
| KR | 10-2010-0052378 A | 5/2010 |
| KR | 1020100056838 A | 5/2010 |
| KR | 1020100118317 A | 11/2010 |
| WO | 03010652 A1 | 2/2003 |
| WO | 2006003869 A1 | 1/2006 |
| WO | 2006009516 A1 | 1/2006 |
| WO | 2007097548 A1 | 8/2007 |
| WO | 2007138393 A2 | 12/2007 |
| WO | 2010006087 A1 | 1/2010 |
| WO | 2010/138952 A2 | 12/2010 |
| WO | 2011066343 A2 | 6/2011 |

OTHER PUBLICATIONS

Korean Office Action, Application No. 10-2011-0001522; Oct. 31, 2013.

Communication, dated Mar. 29, 2012, issued by the European Patent Office in corresponding European Application No. 12150199.3.

Wu-Chun Feng: "An integrated multimedia environment for speech recognition using handwriting and written gestures", Systems Sciences, 2003. Proceedings of the 36th Annual Hawaii International Conference on Jan. 6-9, 2003, Piscataway, NJ, USA, IEEE, Jan. 6, 2003 (Jan. 6, 2003), pp. 128-137, XP010626438, ISBN: 978-0-7695-1874-9.

Communication from the European Patent Office Issued Feb. 5, 2013 in counterpart European Application No. 12161348.3.

International Search Report for PCT/KR2012/000023 dated Oct. 4, 2012 [PCT/ISA/210].

Written Opinion for PCT/KR2012/00023 dated Oct. 4, 2012 [PCT/ISA/237].

US Non-Final Office Action U.S. Appl. No. 13/334,155; Dated Mar. 18, 2013.

US Final Office Action U.S. Appl. No. 13/334,155; Dated Oct. 18, 2013.

US Non-Final Office Action after RCE U.S. Appl. No. 13/334,155; Jan. 30, 2014.

US Non-Final Office Action U.S. Appl. No. 13/315,915, Dated Nov. 29, 2013.

US Non-Final Office Action U.S. Appl. No. 13/329,505, Dated May 15, 2013.

US Non-Final Office Action U.S. Appl. No. 13/329,505, Dated Dec. 3, 2013.

US Non-Final Office Action U.S. Appl. No. 13/531,197; Nov. 29, 2012.

US Final Office Action U.S. Appl. No. 13/531,197, Mar. 18, 2013.

US Non Final Office Action U.S. Appl. No. 13/531,197; Aug. 5, 2013.

US Final Office Action U.S. Appl. No. 13/531,197; Dec. 5, 2013.

(56) References Cited

OTHER PUBLICATIONS

Communication dated Jan. 29, 2015 issued by the United States Patent and Trademark Office in counterpart U.S. Appl. No. 13/315,915.
Communication dated Jan. 23, 2014 issued by the Korean Intellectual Property Office in counterpart Korean Patent Application No. 10-2011-0115084.
Non-Final Office Action dated Mar. 21, 2014 issued by the United States Patent and Trademark Office in U.S. Appl. No. 13/531,197.
Communication dated Dec. 22, 2014, issued by the State Intellectual Property Office of P.R. China in counterpart Chinese Application No. 201210005274.0.
Communication dated Jan. 5, 2015, issued by the United States Patent and Trademark Office in counterpart U.S. Appl. No. 13/531,197.
Communication dated Feb. 5, 2015 issued by the United States Patent and Trademark Office in counterpart U.S. Appl. No. 13/329,505.
Final Office Action dated Apr. 7, 2014 issued by the United States Patent and Trademark Office in counterpart U.S. Appl. No. 13/315,915.
Communication dated Mar. 26, 2014 issued by the Mexican Institute of Industrial Property in counterpart Mexican Patent Application No. MX/a/2013/007942.
Communication dated Jun. 25, 2014, issued by the State Intellectual Property Office of the People's Republic of China in counterpart Chinese Application No. 201210005642.1.
Communication dated Jun. 26, 2014, issued by the United States Patent and Trademark Office in counterpart U.S. Appl. No. 13/329,505.
Communication dated Aug. 6, 2014, issued by the United States Patent and Trademark Office in counterpart U.S. Appl. No. 13/315,915.
Communication dated Aug. 11, 2014, issued by the Korean Intellectual Property Office in counterpart Korean Application No. 10-2011-0001522.
Communication dated Aug. 25, 2014, issued by the United States Patent and Trademark Office in counterpart U.S. Appl. No. 13/531,197.
Communication dated Aug. 29, 2014, issued by the Korean Intellectual Property Office in counterpart Korean Application No. 10-2014-0081937.
Communication dated Sep. 9, 2014 issued by the Mexican Patent Office in counterpart Mexican Patent Application No. MX/a/2013/007942.
Communication issued Sep. 22, 2015, issued by the United States Patent and Trademark Office in counterpart U.S. Appl. No. 13/315,915.
Communication issued Sep. 24, 2015, issued by the United States Patent and Trademark Office in counterpart U.S. Appl. No. 13/334,155.
Communication issued Jun. 30, 2015, issued by the Korean Intellectual Property Office in counterpart Korean Patent Application No. 10-2014-0081937.
Communication issued Aug. 25, 2015, issued by the United States Patent and Trademark Office in counterpart U.S. Appl. No. 13/329,505.
Communication issued Sep. 21, 2015, issued by the United States Patent and Trademark Office in counterpart U.S. Appl. No. 13/531,197.
Communication dated Mar. 23, 2015 issued by the European Patent Office in counterpart European Patent Application No. 11193818.9.
Communication dated Apr. 1, 2015 issued by the Mexican Patent Office in counterpart Mexican Patent Application No. MX/a/2013/007942.
Communication dated Apr. 9, 2015 issued by the U.S. Patent and Trademark Office in counterpart U.S. Appl. No. 13/334,155.
Communication dated Apr. 24, 2015 issued by the U.S. Patent and Trademark Office in counterpart U.S. Appl. No. 14/617,663.
Communication dated Apr. 27, 2015 issued by the Korean Intellectual Property Office in counterpart Korean Patent Application No. 10-2011-0001522.
Communication dated May 5, 2015 issued by the U.S. Patent and Trademark Office in counterpart U.S. Appl. No. 13/531,197.
Communication dated May 5, 2015 issued by the U.S. Patent and Trademark Office in counterpart U.S. Appl. No. 13/315,915.
Communication dated May 7, 2015 issued by the European Patent Office in counterpart European Patent Application No. 12 161 348.3.
Communication dated May 22, 2015 issued by the Chinese Patent Office in counterpart Chinese Patent Application No. 201210005274.0.
Communication issued Jan. 26, 2016, issued by the Japanese Patent Office in counterpart Japanese Patent Application No. 2012-000696.
Communication issued Feb. 8, 2016, issued by the United States Patent and Trademark Office in counterpart U.S. Appl. No. 13/531,197.
Communication issued Feb. 16, 2016, issued by the Japanese Patent Office in counterpart Japanese Patent Application No. 2012-000695.
Communication dated Oct. 15, 2015 issued by the U.S. Patent Office in counterpart U.S. Appl. No. 14/617,663.
Communication dated Sep. 8, 2015 issued by the Mexican Patent Office in counterpart Mexican Patent Application No. MX/a/2013/007942.
Communication issued Jul. 5, 2016, issued by the European Patent Office in counterpart European Patent Application No. 12161348.3.

\* cited by examiner

ELECTRONIC DEVICE CONTROLLED BY A MOTION AND CONTROLLING METHOD THEREOF USING DIFFERENT MOTIONS TO ACTIVATE VOICE VERSUS MOTION RECOGNITION

CROSS-REFERENCE TO RELATED APPLICATION

This application claims priority from Korean Patent Application No. 10-2011-0001522, filed in the Korean Intellectual Property Office on Jan. 6, 2011, the disclosure of which is incorporated herein by reference.

BACKGROUND

1. Field

Apparatuses and methods consistent with exemplary embodiments relate to an electronic device and a controlling method thereof, and more particularly, to an electronic device which can be controlled by a motion and a controlling method thereof.

2. Description of the Related Art

With the development of electronic technology, various types of electronic devices have been developed and are now commonly used. Accordingly, up-to-date technologies which allow a user to use such electronic devices more conveniently and effectively have been developed, and such technologies include a motion recognition technology and a voice recognition technology.

The motion recognition technology is a technology which senses a user's movement, that is, a user's motion using a motion sensor and utilizes the sensed result. The voice recognition technology is a technology which receives and analyzes a user's voice command and utilizes the analyzed result.

Such recognition technologies allow a user to use electronic devices conveniently. However, if a motion or a voice command is not input accurately, an unintended function may be performed, or if the motion or the voice command is not accurately sensed a user needs to repeat the input operation, causing inconvenience to the user.

Particularly, in the case of motion recognition, it is difficult to discern whether a user's motion is intended to perform a certain control operation or not. Furthermore, since such a motion is sensed in a three-dimensional space, operational burden is aggravated.

Therefore, a motion recognition technology which accurately reflects a user's intention and thus performs a corresponding operation with relatively less operational burden is required.

SUMMARY

One or more exemplary embodiments relate to an electronic device which can be controlled using an effective motion recognition technology and a controlling method thereof.

According to an aspect of an exemplary embodiment, there is provided an electronic device including a motion recognition unit disposed in a first surface which recognizes a motion of an object located in front of the first surface of the electronic device and a control unit which, if the motion of the object is in a direction toward the first surface of the electronic device the motion of the object is recognized by the motion recognition unit, activates a motion recognition mode, tracks the motion of the object, and performs a control operation of the electronic device according to a subsequent motion of the object.

The control unit may inactivate the motion recognition mode, if an end motion in which the motion of the object is in a direction to contact a body part of a user or an additional object is recognized by the motion recognition unit while the motion recognition mode is activated.

The motion recognition unit may include a photographing unit which generates photographing image data including depth information of the object by photographing the object and a determination unit which determines if a push motion occurs if depth information of a pixel group corresponding to the object is changed on the photographing image data.

The device may further include a voice input unit which receives a voice input, and the control unit, if a first motion representing a voice recognition mode is recognized, may convert a motion recognition mode to the voice recognition mode and performs a control operation of the electronic device according to the voice input.

The control unit may inactivate the voice recognition mode, if a second motion which is opposite to the first motion is recognized.

The device may further include a storage unit which stores information regarding a shape and size of the object, and the information regarding the shape and size of the object may be changed by a user's setting.

The push motion may be a push-pull motion in which the object moves in a direction of the electronic device and moves in a direction opposite of the electronic device or a push-stop motion in which the object moves in a direction of the electronic device and stops.

According to an aspect of an exemplary embodiment, there is provided a method for controlling an electronic device, the method including photographing an object located in front of the electronic device and recognizing a push motion in which the object moves in a direction of the electronic device and if the push motion is recognized, activating a motion recognition mode; tracking movement of the object and performing an operation corresponding to the movement of the object.

The method may further include inactivating the motion recognition mode if an end motion in which the object moves in a direction to contact a body part of a user or an additional object is recognized by the motion recognition unit is recognized while the motion recognition mode is activated.

The recognizing of the push motion of the object may include generating photographing image data by photographing a front side of the electronic device and determining that the push motion occurs if depth information of a pixel group corresponding to the object is changed on the photographing image data.

The determining that the push motion occurs may include reading pre-stored information regarding a shape and size of a pixel group corresponding to the object, and comparing a shape and size of a portion of which depth information is changed from among whole pixels of the photographing image data with the pre-stored information and determining that a push motion of the object occurs if the information matches with each other, and the information may be changeable by a user's setting.

The method may further include, if a first motion representing a voice recognition mode is recognized, converting a motion recognition mode to the voice recognition mode and performing a control operation of the electronic device corresponding to the voice input.

The method may further include, if a second motion which is opposite to the first motion representing the voice recognition mode is recognized, inactivating the voice recognition mode.

The push motion may be a push-pull motion in which the object moves in a direction of the electronic device and moves in a direction opposite of the electronic device or a push-stop motion in which the object moves in a direction of the electronic device and stops.

According to various exemplary embodiments, a user may use a motion recognition mode by making a push motion. Thus, operational burden may be reduced and malfunction of motion recognition may be prevented.

BRIEF DESCRIPTION OF THE DRAWINGS

The above and/or other aspects of the exemplary embodiments will be more apparent by describing in detail the exemplary embodiments with reference to the accompanying drawings, in which.

DETAILED DESCRIPTION

Figure 1:
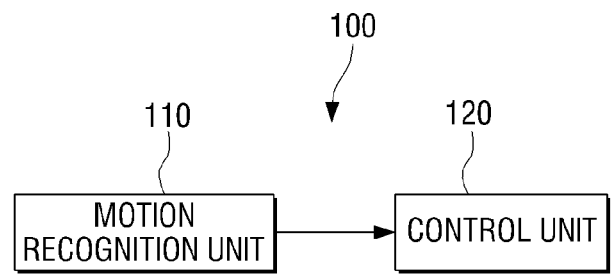
FIG. 1 is a block diagram illustrating configuration of an electronic device according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, exemplary embodiments can be practiced without those specifically defined matters. Also, well-known functions or constructions are not described in detail since they would obscure the application with unnecessary detail.

FIG. 1 is a block diagram illustrating a configuration of an electronic device according to an exemplary embodiment. The electronic device may be embodied as a display apparatus having a display unit such as a television, a monitor, a notebook PC, an electronic photo album, an electronic book, a PDA, and a navigator, or as various home appliances such as a refrigerator, air conditioner, and an audio system.

According to FIG. 1, the electronic device 100 includes a motion recognition unit 110 and a control unit 120. The motion recognition unit 110 senses movement, that is, a motion of a user of the electronic device 100 and recognizes whether a user motion has occurred with respect to the electronic device 100.

To do so, the motion recognition unit 110 may include a photographing apparatus such as a camera. The motion recognition unit 110 photographs the user within a photographing scope of the photographing apparatus, analyzes the photo of the user, and recognizes a user motion. Specifically, the motion recognition unit 110 may include a photographing apparatus such as a depth camera which may generate photographing image data including depth information of the user motion.

Accordingly, the motion recognition unit 110 may recognize user motion with respect to the electronic device 100 such as a push motion in a direction of the electronic device 100 within a photographing scope of the electronic device 100. Specifically, a three-dimensional coordinates are applied, in which the y-axis is disposed in a vertical direction with respect to the electronic device 100, the x-axis is disposed in a horizontal direction with respect to the electronic device 100, and the z-axis is disposed toward the electronic device 100 a push motion represents a motion along the z-axis direction.

If a push motion is recognized by the electronic device 100, the control unit 120 determines that an operation should be performed in a motion recognition mode and converts a current mode of a remote controller used to control the electronic device 100 to the motion recognition mode. That is, before the push motion is recognized, manipulation of the remote controller or a control operation according to manipulation of keys on the main body of the electronic device 100 is performed in a general mode. Once the general mode or a current mode is converted into a motion recognition mode, the control unit 120 recognizes a user's motion and performs an operation corresponding to the user's motion.

In this case, the control unit 120 recognizes a motion of a corresponding object by tracking movement of the object which performs an initial push motion and performs a control operation of the electronic device 100 corresponding to the recognized motion. The examples of such an operation include turn-on and turn-off of power, change of channel, change of volume, and change of page to the previous or upper page, selection of various menus or icons, movement of a cursor, and so on.

Once a current mode is converted into a motion recognition mode, the control unit 120 may not receive inputs other than a motion input. However, in another exemplary embodiment, if there is manipulation of keys on a remote controller or a main body, the control unit 120 may perform a corresponding operation even if the remote controller is in a motion recognition mode. That is, an operation of the electronic device 100 is not always controlled by a motion in a motion recognition mode.

Meanwhile, if a predetermined motion is recognized by the motion recognition unit 110, the control unit 120 stops a motion recognition mode. Hereinafter, a motion to stop a motion recognition mode will be referred to as a stop motion. The stop motion may be set in various ways. For example, if an object is the palm of a user, a stop motion may be a motion where the palm contacts a body part of the user or other objects so that the palm is no longer recognized, which will be explained later with reference to a corresponding drawing.

As described above, if a motion recognition mode is initiated using a push motion, there is no need to analyze a motion in the x-axis direction and in the y-axis direction until movement in the z-axis direction is recognized. Accordingly, operational burden due to data parsing of a photographed image in all three axes may be reduced. The movements in the x-axis or y-axis directions may occur unintentionally in a daily life, but a push motion in which a palm is stretched out in the direction of an electronic device 100 can be regarded as an intentional motion to control the electronic device 100. Accordingly, motion recognition control may be performed as a user's intention is recognized more accurately by making a motion in the z-axis direction instead of the x-axis direction or y-axis direction.

Figure 2:
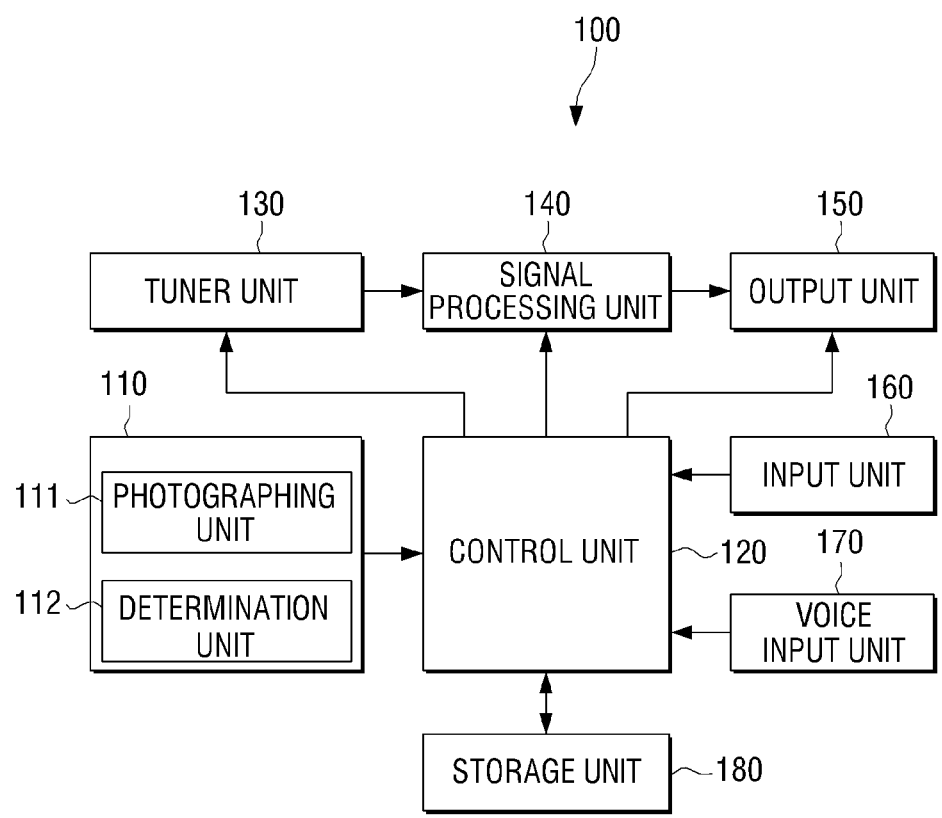
FIG. 2 is a block diagram illustrating detailed configuration of an electronic device for explaining various exemplary embodiments.

FIG. 2 is a block diagram illustrating a configuration of an electronic device 100 according to various exemplary embodiments. Specifically, FIG. 2 illustrates an example of configuration of a display apparatus which is capable of tuning a broadcast signal channel and outputting broadcast data like a television.

According to FIG. 2, the electronic device 100 may comprise not only the motion recognition unit 110, the control unit 120, but also a tuner unit 130, a signal processing unit 140, an output unit 150, an input unit 160, a voice input unit 170, and a storage unit 180.

The tuner unit 130 selects a broadcast signal channel, receives a corresponding broadcast signal, down-converts the received broadcast signal and provides the down-converted signal to the signal processing unit 140.

The signal processing unit 140 performs signal processing such as demodulating, equalizing, decoding, or scaling the signal provided from the tuner unit 130 and provides the processed signal to the output unit 150.

The output unit 150 outputs a video signal and an audio signal processed by the signal processing unit 140 using output elements such as a display unit or a speaker.

The input unit 160 receives a user selection signal according to manipulation of keys on a main body of the electronic device 100 or on an external remote controller. Specifically, the input unit 160 may include a key pad and an IR signal receiving lamp.

The voice input unit 170 receives audio created by a user. If a user's voice is input, the voice input unit 170 may analyze the input voice using a voice recognition technology.

The internal components of the voice input unit 170 may differ according to a technology used. For example, if a word recognition technology is used, the voice input unit 170 may include a microphone unit which collects voice, an analyzing unit which analyzes the collected voice, a phoneme recognition unit which recognizes a phoneme using the analysis result, a word recognition unit which recognizes a word using the recognized phoneme, and a processing unit (the components are not shown) which provides the recognized word to a control unit.

The analyzing unit performs mathematical conversion processing such as frequency analysis or linear predictive analysis with respect to a received voice input signal at a short period of every 20~30 ms, and outputs a vector-based signal representing a feature accordingly. The phoneme recognition unit performs segmentation using the features of an output signal to segment each section of a voice signal as one unit and recognize a vowel and a consonant from the unit. The recognition result may be provided to the word recognition unit in the form of a phoneme lattice. The word recognition unit converts the phoneme lattice to a word lattice by referring to a word dictionary where a sound form of a word is recorded. The word dictionary may be stored in the voice input unit 170 or in a memory of the electronic device 100. The processing unit composes a word line using words included in the word lattice which are related in terms of their meaning.

The storage unit 180 stores various information related to the electronic device 100. For example, information regarding an object may be stored in the storage unit 180. The information regarding an object may be the shape or size of the subject, and the information may be changed by a user.

If the palm of a user is used as an object as described above, the user may photograph his or her palm through the motion recognition unit 110 in advance and register information regarding the shape and size of the palm in the storage unit 180. Accordingly, it is impossible to perform motion recognition control with respect to other users whose subjects are not registered. Thus, only the registered user can be authorized to use the electronic device 100.

According to another exemplary embodiment, information regarding an object may be stored in the storage unit 180 as a default when the electronic device 100 is manufactured.

Meanwhile, according to another exemplary embodiment, information regarding an object may not be stored in the storage unit 180 in advance. Instead, if a push motion is recognized in an arbitrary position in the photographing image data, a current mode may be immediately changed to a motion recognition mode regardless of the shape or size of the object.

Alternatively, if there are a plurality of users, only the object of a user who made a push motion for the first time may be tracked and an electronic device may be controlled according to the tracked subject.

Meanwhile, according to FIG. 2, the motion recognition unit 110 includes a photographing unit 111 and a determination unit 112. The photographing unit 111 may have a three-dimensional (3D) depth camera for sensing movement in the direction of the electronic device 100. The 3D depth camera irradiates infrared rays and measures the time for the infrared rays to reach an object and return to the camera to calculate the distance between the camera and the object. The image photographed by the depth camera is output as a grey level, and coordinates of width, length, and distance are represented for each pixel. That is, photographing image data including depth information for each pixel is generated.

The determination unit 112 analyzes photographing image data generated by the photographing unit 111 and determines whether a push motion occurs. Specifically, a pixel group corresponding to the above-mentioned object is searched and it is determined whether depth information of the searched pixel group has changed. In this case, the determination unit 112 determines that a push motion has occurred only when an object gets closer to the electronic device 100 rather than when an object moves away from the electronic device 100.

In another exemplary embodiment, the determination unit 112 determines whether depth information from among photographing image data has been changed. If it is determined that the depth information has changed along the z-axis direction, it is considered that a push motion has occurred. In this case, if there is pre-registered information regarding a subject, the determination unit 112 determines whether there is similarity between the shape and size of the pixel group of which depth information has been changed and the pre-registered information. If it is determined that there is a similarity, it is determined that a push motion has occurred.

As described above, a push motion in which an object moves towards an electronic device 100 is used as a motion to convert a current mode to a motion recognition mode. Since a push motion is a motion in the z-axis direction with respect to the electronic device 100, the motion recognition unit 110 determines whether a push motion has occurred by checking only whether depth information of photographing image data has been changed. If a push motion occurs and thus, a current mode is converted to a motion recognition mode, the motion recognition unit 110 checks not only movement in the z-axis direction but also movement in the x-axis and in the y-axis to analyze the movement of the subject.

If a current mode is converted to a motion recognition mode according to the recognition result of the motion recognition unit 110, the control unit 120 performs an operation corresponding to a subsequent motion. The information regarding an operation for each motion may be stored in the storage unit 180. If a motion is recognized by the motion recognition unit 110 in a motion recognition mode, the control unit 120 checks whether information regarding an operation corresponding to the recognized motion is stored in the storage unit 180. If it is determined that the information is stored, the control unit 120 controls the tuner unit 130, the signal processing unit 140, the output unit 150, the input unit 160, the voice input unit 170, and the storage unit 180 to perform a corresponding operation.

For example, if a motion representing a command to change a channel is recognized, the control unit 120 controls the tuner unit 130 to select another channel according to the motion.

Meanwhile, according to another exemplary embodiment, if a specific motion is sensed in a general mode or in a motion recognition mode, the control unit 120 may convert the mode to a voice recognition mode in which the voice input unit 170 is used. That is, if a motion for entering into a voice recognition mode is sensed, the control unit 120 activates the voice input unit 170 to receive a voice command in accordance with a user's pronunciation. Accordingly, an operation corresponding to the voice command may be performed.

According to an exemplary embodiment, if a motion for entering into a voice recognition mode is recognized while an electronic device 100 is operated in a motion recognition mode, the control unit 120 may stop the motion recognition mode automatically and perform voice control in the voice recognition mode. In this case, the control unit 120 may inactivate the motion recognition unit 110 automatically. Herein, the inactivation operation may represent an operation to stop supplying power to the motion recognition unit 110.

According to another exemplary embodiment, if a motion for entering into a voice recognition mode is recognized before a motion recognition mode is ended, the control unit 120 may control to perform both motion control and voice control. That is, the control unit 120 may activate both the motion recognition unit 110 and the voice input unit 170 and perform a corresponding operation in response to both motion and voice of a user.

In addition, the control unit 120 may perform an operation according to a user's selection signal input through the input unit 160 even when an electronic device is operated in a voice recognition mode or a motion recognition mode.

Meanwhile, FIG. 2 illustrates a configuration including the input unit 160, the voice input unit 170, and the motion recognition unit 110, but this is only an example. If a voice recognition mode is not supported, the voice input unit 170 may be excluded.

Figure 3:
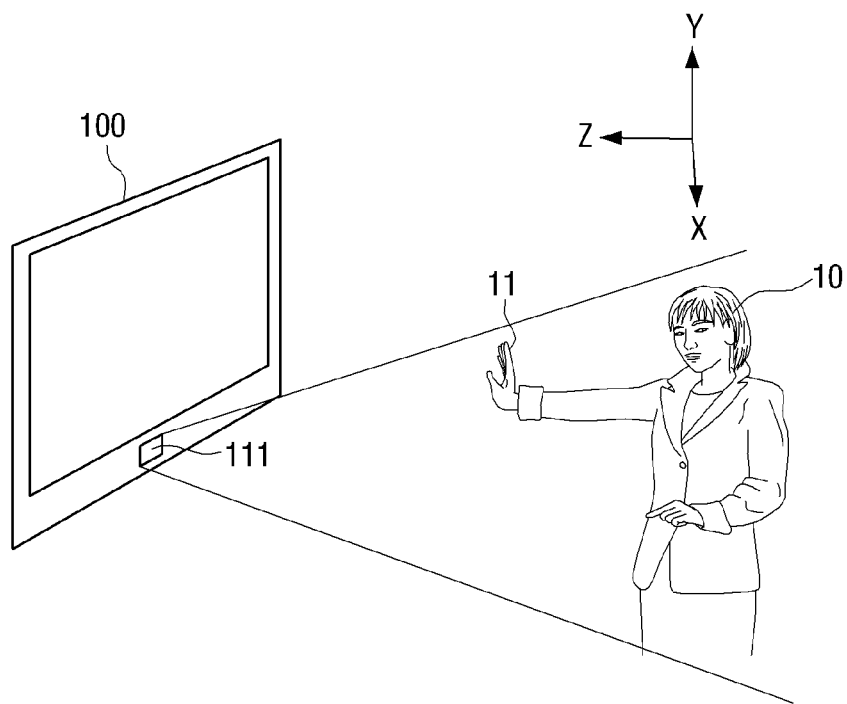
FIG. 3 is a view for explaining a push motion.

FIG. 3 is a view for explaining a push motion. As illustrated in FIG. 3, the electronic device 100 may be embodied as a television. In this case, the photographing unit 111 may be disposed to face a front side where a user using the television is mainly located. In this state, the user raises a hand and moves or pushes his or her palm towards the electronic device 100, which is a push motion. Therefore, the hand or the palm corresponds to the above-mentioned subject. However, a command stick or a specific card instead of a hand or a palm may be used as a subject.

As described above, the x-axis and the y-axis are disposed to form a horizontal surface with respect to a display screen, and the z-axis is disposed to face the electronic device 100 to be perpendicular to the surface of the x-axis and the y-axis. In the push motion, an object 11 (i.e., user's palm) moves in the direction of the electronic device 100 along the z-axis.

Figure 4:
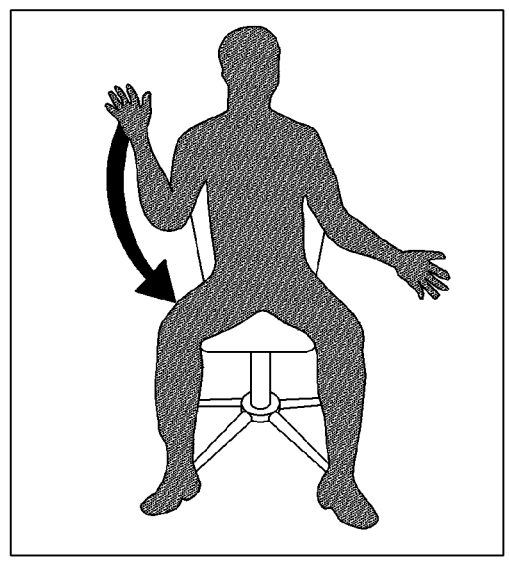
FIGS. 4 and 5 are views illustrating various examples of a stop motion to stop a motion recognition mode.

FIG. 4 is a view illustrating an example of a motion to end a motion recognition mode. According to FIG. 4, a motion in which the object 11 (i.e., palm) touches a part of a body of a user may be used as an end motion. If the object 11 is tracked and it is determined that the size of a pixel group corresponding to the object 11 is decreased and disappeared as the object 11 being tracked moves towards a lower side of the body of the user, the electronic device 100 recognizes the change in the pixel size as an end motion and inactivates a motion recognition mode.

Figure 5:
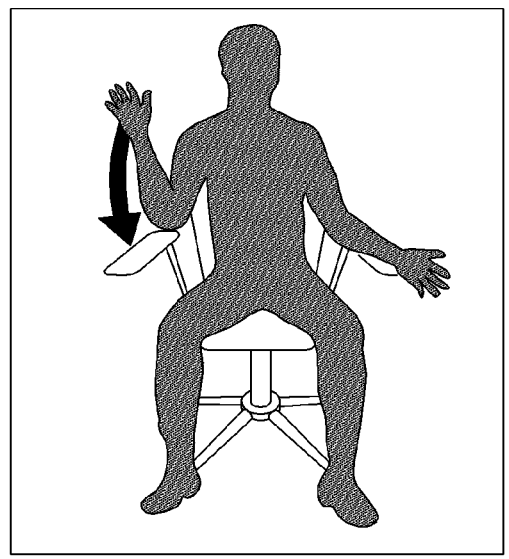

FIG. 5 is a view illustrating another example of a motion to end a motion recognition mode. According to FIG. 5, a motion in which the object 11 touches other objects instead of a part of a body of a user may be used as an end motion. As in FIG. 4, if a hand, that is, the object 11 touches an object, the size of a pixel group corresponding to the object 11 is decreased and disappears and thus, the electronic device 100 recognizes the change in the pixel size as an end motion and may inactivate a motion recognition mode.

In most cases, a user uses his or her hand to perform motion control.

According to the various exemplary embodiments, if a user raises a hand and places it in front of the electronic device 100, this motion is recognized as a push motion and thus, a motion recognition mode is initiated automatically. Subsequently, if the user makes various motions using the hand afterwards and then puts down the hand, the motion recognition mode is finished automatically. Thus, the user may start and end motion control easily.

Meanwhile, in FIGS. 4 and 5, a motion recognition mode is finished when the object 11 is put down as the object 11 touches a user's leg or an object, but this is only an example. A motion recognition mode may be finished when a specific key to finish the motion recognition mode is input.

Alternatively, if any specific motion is sensed for a predetermined threshold period of time (for example, about one minute) after a motion recognition mode has started, the motion recognition mode may be inactivated immediately.

Figure 6:
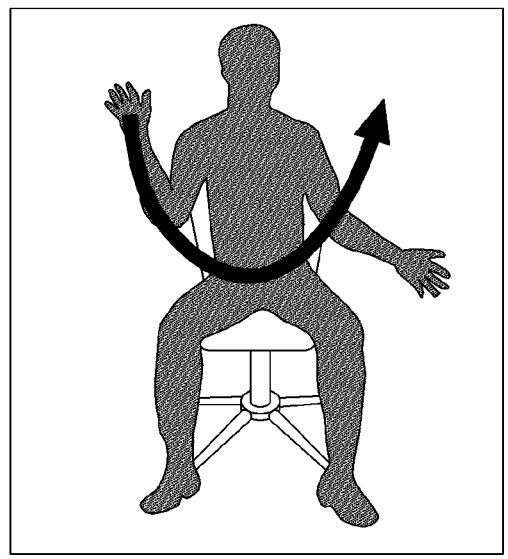
FIGS. 6 to 8 are views illustrating various examples of a motion to activate or inactivate a voice recognition mode.

FIG. 6 illustrates an example of a motion for activating a voice recognition mode. According to FIG. 6, a user may initiate a voice recognition mode by performing the first motion which represents a voice recognition mode. A motion representing a voice recognition mode refers to a motion which a user may associate with a voice recognition mode. According to FIG. 6, if a user makes a first motion indicating "V" for "Voice", a voice recognition mode is initiated.

Once a voice recognition mode has started, a user may perform voice control by pronouncing various voice commands. If a user makes a specific motion again in the voice recognition mode, or if there is no voice input for a predetermined period of time, the voice recognition mode may automatically terminate.

Figure 7:
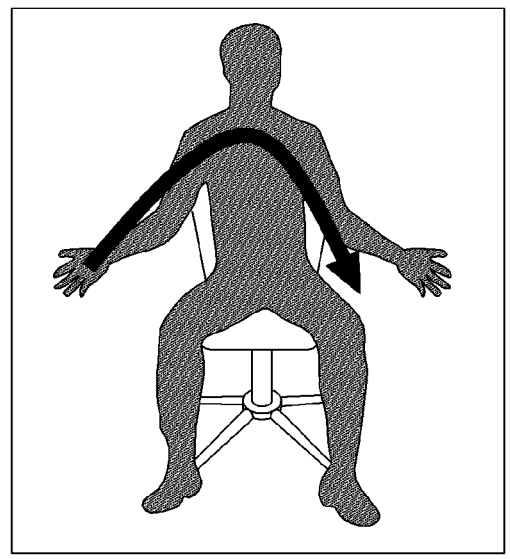

FIG. 7 illustrates an example of a motion for inactivating a voice recognition mode. According to FIG. 7, if the user's object 11 makes a second motion which is opposite to the first motion, that is, a curve of an inverse "V", a voice recognition mode is inactivated.

Figure 8:
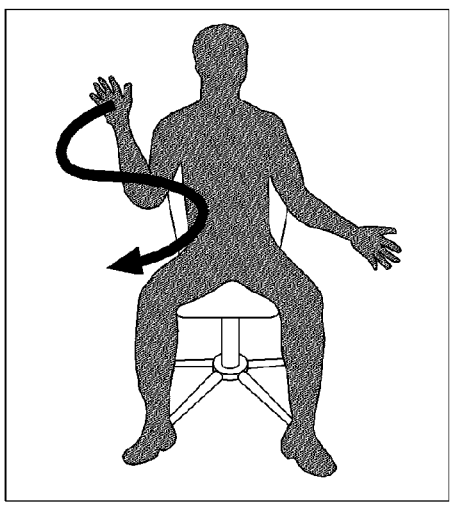

FIG. 8 illustrates an example of another motion for activating or inactivating a voice recognition mode. According to FIG. 8, a curve of "S" representing "Speech" may be used as a motion for activating or inactivating a voice recognition mode. Meanwhile, as illustrated above, a user may make a motion in FIG. 6 or FIG. 8 in a general mode to activate a voice recognition mode.

Alternatively, a user may make a motion in FIG. 6 or FIG. 8 while a mode is being converted to a motion recognition mode to activate a voice recognition mode. In this case, if a motion to inactivate a voice recognition mode (that is, the motion in FIG. 7), a voice command, or a key input signal is input, the electronic device 100 may be converted to a motion recognition mode.

Meanwhile, in the above various exemplary embodiments, the electronic device 100 senses a push motion using a 3D depth camera by analyzing photographing image data including depth information. However, the electronic device 100 may sense a push motion without using a 3D depth camera by recognizing change of size on a 2D surface.

Figure 9:
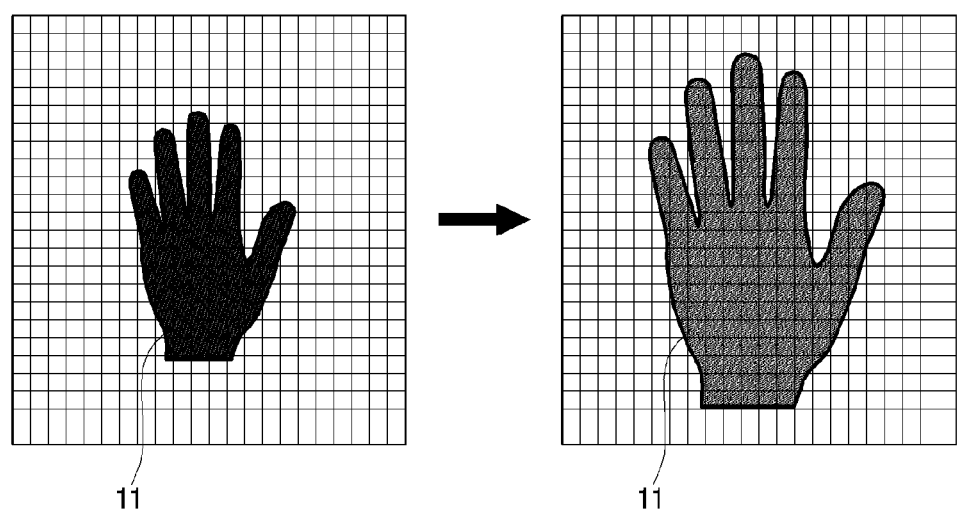
FIG. 9 is a view for explaining a process of recognizing a push motion.

FIG. 9 is a view illustrating analyzing photographing image data to recognize a push motion. According to FIG. 9, the electronic device 100 divides each frame of photographing image data including an object into a plurality of blocks and checks the number of blocks corresponding to the subject. The left and right views of FIG. 9 represent the current frame and the next frame (or a frame in a predetermined period of time) respectively. As illustrated in FIG. 9, if the number of blocks corresponding to the object 11 increases in the next frame in comparison with the current frame, such change in the number of frames may be recognized as a push motion. The blocks corresponding to the object 11 represent continuous blocks of which average pixel value is within a scope similar to the average pixel value of the object 11.

Figure 10:
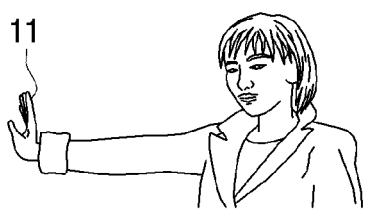
FIG. 10 is a view for explaining a push-pull motion.
Figure 10:
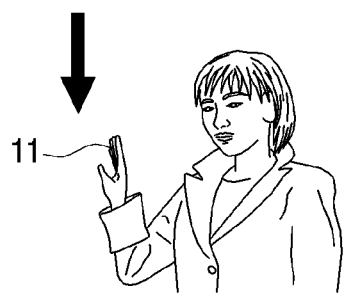

Meanwhile, FIG. 10 illustrates a push-pull motion, that is, a motion in which the object 11, that is, a hand is stretched towards an electronic device 100 and then withdrawn. An experiment shows that a user generally stretches his or her hand to make a push motion and withdraws the hand reflexively. Therefore, a motion recognition mode may be initiated when a push-pull motion is sensed to distinguish it from a motion of simply stretching a hand. An electronic device may determine whether depth information increases and decreases in the z-axis direction with respect to the electronic device 100 and recognize a push-pull motion.

Alternatively, a motion recognition mode may be initiated when a push-stop motion in which a hand is stretched and maintained occurs.

As such, a push motion may include a push-pull motion or a push-stop motion.

Figure 11:
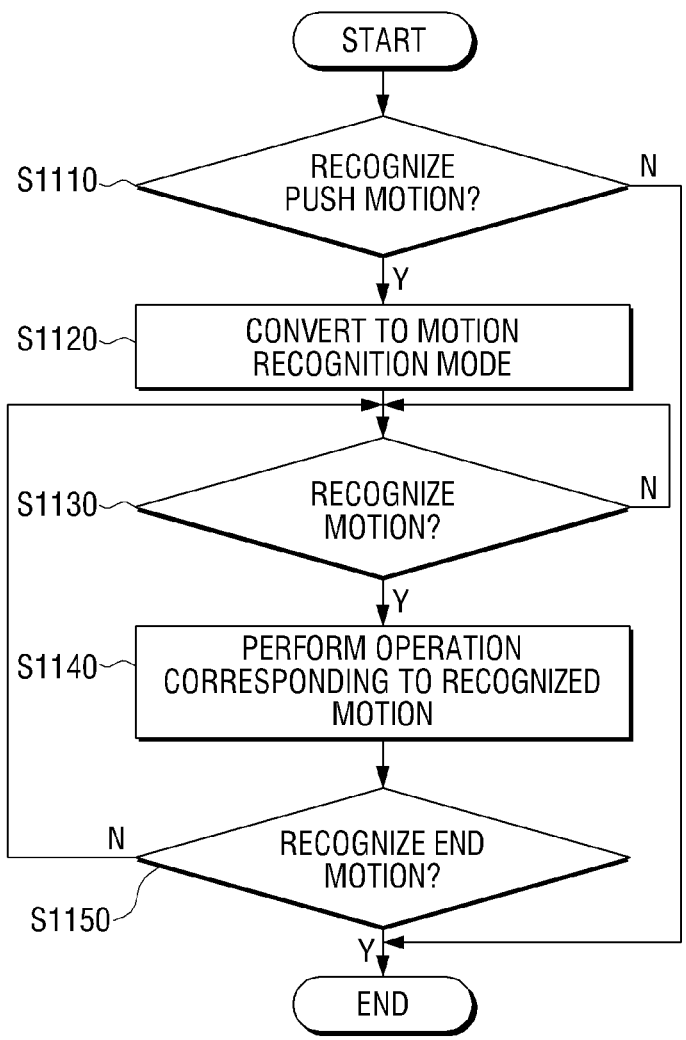
FIG. 11 is a flowchart for explaining a method for controlling an electronic device according to various exemplary embodiments.

FIG. 11 is a flowchart for explaining a method for controlling an electronic device 100 according to an exemplary embodiment. According to FIG. 11, if it is determined that a push motion occurs (S1110), a mode is converted to a motion recognition mode (S1120).

The step of determining whether a push motion occurs may be embodied in various exemplary embodiments. For example, pre-stored information regarding the shape and size of a pixel group corresponding to an object may be read out, and the shape and size of pixels of which depth information is changed, from among whole pixels of photographing image data, may be compared with the pre-stored information. If the pre-stored information matches with the changed information, it may be determined that a push motion of an object occurs. The above-mentioned information regarding an object may be changed by a user or a manufacturer.

If a subsequent mode is recognized in a motion recognition mode (S1130), an operation corresponding to the recognized motion is performed (S1140).

For example, if a motion of shaking a hand occurs, an electronic device may perform an operation of changing a page to the previous pager or to the upper page, and if a motion of moving a hand in one direction, an operation of moving a cursor in the corresponding direction may be performed. Alternatively, if a hold motion in which a hand does not move for a predetermined period of time while a cursor is located on a specific menu, the corresponding menu may be selected and performed. In addition, channel adjustment or volume adjustment may be performed in a channel adjustment menu or a volume adjustment menu according to a direction and distance of a hand which has been moved.

If a motion for activating a voice recognition mode is input, a voice recognition mode may be activated. That is, if a user wishes to use a voice recognition mode in a normal mode, the user may make a push motion by raising his or her hand and stretching the hand frontward, such as the motion illustrated in FIG. 6 or FIG. 8, and then put down the hand. Accordingly, a voice recognition mode may be entered immediately.

In a motion recognition mode, an electronic device may apply a different level of operation according to the speed and distance of a motion. For example, in a motion for changing a channel, if a motion is taken at a general speed and distance, a channel may be changed as many by one channel. However, if a motion is taken at a speed and distance greater than a threshold value, a channel may be changed by as many as five channels or ten channels. As such, a level of operation may be set differently according to the speed and distance of a motion.

Whether a motion occurs or not may be determined by comprehensively considering the time from when the motion starts to when the motion ends, the frequency and the distance of the motion.

Meanwhile, a program code for performing the above-mentioned controlling method may be stored in various types of recording media readable by a terminal, such as Random Access Memory (RAM), flash memory, Read Only Memory (ROM), Erasable Programmable ROM (EPROM), Electronically Erasable and Programmable ROM (EEPROM), register, HDD, removable disk, memory card, USB memory, and CD-ROM.

Accordingly, the above-mentioned controlling method may be supported if a recording medium including the above-mentioned program is connected to or mounted on various apparatuses which can recognize a motion.

Although a few exemplary embodiments have been shown and described, it would be appreciated by those skilled in the art that changes may be made to the embodiments without departing from the principles and spirit of the inventive concept, the scope of which is defined in the claims and their equivalents.

What is claimed is:

1. An electronic device which supports motion recognition, comprising:
   a photographing unit configured to obtain an image including depth information which is information corresponding to variation in a distance between a photographed object and the electronic device;
   a determination unit configured to identify an object from the image including the depth information obtained by the photographing unit and determine a motion corresponding to a movement of the object;
a control unit configured to inactivate a motion recognition mode if the motion determined by the determination unit is a first motion and the motion recognition mode is activated; and
a voice input unit configured to receive a voice input,
wherein, if a third motion different from the first motion is recognized, the control unit is further configured to activate a voice recognition mode and perform an operation according to the voice input, or if a fourth motion is recognized, the control unit is further configured to inactivate the voice recognition mode.

2. The device as claimed in claim 1, wherein the first motion is a motion in which the object is in contact with a body part of a user or a thing outside of the user.

3. The device as claimed in claim 2, wherein if the motion recognition mode is not activated and the motion determined by the determination unit is a second motion in which the object in front of the electronic device moves in a direction toward the electronic device, the control unit activates the motion recognition mode.

4. The device as claimed in claim 3, wherein the photographing unit is further configured to generate photographing image data including the depth information by photographing the object, and
the determination unit is further configured to determine that the second motion occurs if depth information of a pixel group corresponding to the object is changed on the photographing image data.

5. The device as claimed in claim 4, wherein the second motion is a push-pull motion in which the object moves toward the electronic device and moves back in an opposite direction away from the electronic device, or a push-stop motion in which the object moves toward the electronic device and stops.

6. The device as claimed in claim 1, wherein if the motion activation mode is not activated, the determination unit is further configured to only determine the motion in a z-axis direction, and
wherein if the motion activation mode is activated, the determination unit is further configured to determine the motion in the z-axis direction, a y-axis direction, and an x-axis direction.

7. The device as claimed in claim 6, wherein the x-axis and the y-axis form a horizontal surface with respect to a display screen of the electronic device, and the z-axis is perpendicular to the horizontal surface.

8. The device as claimed in claim 1, further comprising:
a storage configured to store information regarding a shape and size of the object, wherein the information regarding a shape and size of the object is changeable by the user's setting.

9. A method for controlling an electronic device which supports motion recognition, the method comprising:
at least one processor which executes:
obtaining an image including depth information which is information corresponding to variation in a distance between a photographed object and the electronic device;
identifying an object from the obtained image including the depth information;
determining a motion corresponding to a movement of the object;
inactivating a motion recognition mode if the determined motion is a first motion and the motion recognition mode is activated; and
receiving a voice input,
wherein, if a third motion different from the first motion is recognized, activating a voice recognition mode and performing an operation according to the voice input, or if a fourth motion is recognized, inactivating the voice recognition mode.

10. The method as claimed in claim 9, wherein the first motion is a motion in which the object is in contact with a body part of a user or a thing outside of the user.

11. The method as claimed in claim 10, further comprising:
activating the motion recognition mode if the motion recognition mode is not activated and the determined motion is a second motion in which the object in front of the electronic device moves in a direction toward the electronic device.

12. The method as claimed in claim 11, wherein in the identifying the object, it is determined that the second motion occurs if depth information of a pixel group corresponding to the object in the image is changed.

13. The method as claimed in claim 12, wherein the second motion is a push-pull motion in which the object moves toward the electronic device and moves back in an opposite direction away from the electronic device, or a push-stop motion in which the object moves toward the electronic device and stops.

14. The method as claimed in claim 9, wherein if the motion activation mode is not activated, only determining the motion in a z-axis direction, and
wherein if the motion activation mode is activated, determining the motion in the z-axis direction, a y-axis direction, and an x-axis direction.

15. The device as claimed in claim 14, wherein the x-axis and the y-axis form a horizontal surface with respect to a display screen of the electronic device, and the z-axis is perpendicular to the horizontal surface.

16. The method as claimed in claim 9, wherein information regarding a shape and size of the object is stored in the electronic device and is changeable by the user's setting.

17. An electronic device comprising:
a control unit configured to control the electronic device to perform a first function corresponding to a first user motion, in response to detecting the first user motion while a motion activation mode is activated;
a camera configured to capture an image including depth information which is information corresponding to variation in a distance between a photographed object and the electronic device along a z-axis direction; and
a determination unit configured to analyze the image to identify the object and determine a motion of the object; and
a voice input unit configured to receive a voice input,
wherein if the motion activation mode is activated, the determination unit determines the motion of the object in the z-axis direction, an x-axis direction, and a y-axis direction,
wherein if the motion activation mode is inactivated, the determination unit determines the motion of the object only in the z-axis direction,
wherein if the motion activation mode is activated and the determined motion corresponds to the first user motion, the control unit controls the electronic device to perform the first function, the first user motion being a motion only in the x-axis direction and the y-axis direction,
wherein if the motion activation mode is activated and the determined motion corresponds to a second user motion, the control unit is further configured to inactivate the motion activation mode, wherein if the motion activation mode is inactivated and the determined motion corresponds to a third user motion, the control unit is further configured to activate the motion activation mode, the third user motion being a motion only in the z-axis direction, and wherein, if the motion activation mode is activated and the determined motion corresponds to a fourth user motion different from the second user motion, the control unit is further configured to activate a voice recognition mode and perform a second function according to the voice input, or if the determined motion is a fifth user motion, the control unit is further configured to inactivate the voice recognition mode.

* * * * *